United States Patent
Payne et al.

(10) Patent No.: US 9,811,542 B1
(45) Date of Patent: Nov. 7, 2017

(54) METHOD FOR PERFORMING TARGETED BACKUP

(71) Applicant: Veritas Technologies LLC, Mountain View, CA (US)

(72) Inventors: Michael A. Payne, Archer, FL (US); Steven R. Devos, Mercer Island, WA (US)

(73) Assignee: Veritas Technologies LLC, Mountain View, CA (US)

(*) Notice: Subject to any disclaimer, the term of this patent is extended or adjusted under 35 U.S.C. 154(b) by 55 days.

(21) Appl. No.: 13/931,992

(22) Filed: Jun. 30, 2013

(51) Int. Cl.
*G06F 17/30* (2006.01)

(52) U.S. Cl.
CPC .............. *G06F 17/30289* (2013.01)

(58) Field of Classification Search
CPC ............................................. G06F 17/30289
USPC ........................................................ 707/647
See application file for complete search history.

(56) References Cited

U.S. PATENT DOCUMENTS

| | | | | |
|---|---|---|---|---|
| 7,395,390 B2* | 7/2008 | Chen | ............................. | 711/162 |
| 8,429,359 B1* | 4/2013 | Desai et al. | .................. | 711/162 |
| 8,600,940 B2* | 12/2013 | Gilpin et al. | ................. | 707/640 |
| 8,898,114 B1* | 11/2014 | Feathergill | ........ | G06F 17/30159 |
| | | | | 707/648 |
| 8,996,468 B1* | 3/2015 | Mattox | ................... | G06F 17/30 |
| | | | | 707/650 |
| 2003/0208511 A1 | 11/2003 | Earl | ............................. | 707/204 |
| 2003/0225733 A1* | 12/2003 | Rhodes | ............. | G06F 17/30569 |
| 2007/0208918 A1* | 9/2007 | Harbin | ................ | G06F 11/1451 |
| | | | | 711/162 |
| 2010/0114831 A1* | 5/2010 | Gilbert | .............. | G06F 17/30575 |
| | | | | 707/648 |
| 2010/0198791 A1 | 8/2010 | Wu | ............................... | 707/644 |
| 2013/0024722 A1 | 1/2013 | Kotagiri et al. | ............... | 714/6.1 |
| 2013/0151494 A1 | 6/2013 | Dhamankar | .................. | 707/703 |

OTHER PUBLICATIONS

Payne, Michael A.; "Targeted Backup Using Transaction Logs"; U.S. Appl. No. 14/040,922, filed Sep. 30, 2013; consisting of Specification, Claims and Abstract (37 pages); and Drawings (16 sheets).

* cited by examiner

*Primary Examiner* — Jorge A Casanova
(74) *Attorney, Agent, or Firm* — Campbell Stephenson LLP

(57) ABSTRACT

Methods, computer program products, computer systems, and the like, which provide for the performance of a targeted backup operation, are disclosed. Such a targeted backup operation is performed on a backup that comprises a plurality of data blocks. The data blocks, in turn, comprise an in-use data block and an unused data block. The targeted backup operation comprises performing a backup operation on the in-use data block.

21 Claims, 13 Drawing Sheets

METHOD FOR PERFORMING TARGETED BACKUP

FIELD OF THE INVENTION

The present disclosure relates to backup operations, and more particularly, to a method and apparatus for performing targeted backup of a database.

BACKGROUND OF THE INVENTION

An ever-increasing reliance on information and computing systems that produce, process, distribute, and maintain such information in its various forms, continues to put great demands on techniques for providing data storage, access to that data storage, and protection of the data thus stored. Business or enterprise organizations can produce and retain large amounts of data. While data growth is not new, the pace of data growth has become more rapid, the location of data more dispersed, and linkages between data sets more complex, with each passing day.

In this regard, nowhere is today's rapid growth in data felt more keenly than in the database arena. As will be appreciated, databases are often stored in volumes created by storage devices, which can be viewed as a sequence of logical storage blocks that store the database data. While a volume is typically referred to as storing data, in reality, the data is actually stored directly or indirectly in the physical blocks of a storage device (e.g., a disk array) that are allocated to the volume's storage blocks. Such a logical view of data storage allows, at least in part, the data stored therein to grow as necessary. In this regard (and in order to improve performance), such databases include some (often significant amounts of) unused storage space (e.g., unused storage blocks). Such unused storage space allows new data to be inserted into the database (e.g., into one or more unused rows in a table in the database) more quickly than if the storage space for such data were to be allocated at the time such storage space was needed. Such unused storage space may be cleared (e.g., to zero values), may contain old (uncleared) data, or find itself in some other indeterminate state (e.g., having never been used to store data in the first place).

As will be appreciated, the data thus maintained is typically quite valuable. As a result, backup operations are typically performed on some regular, periodic basis, in order to safeguard the information in such databases and other such constructs. In the event of data corruption as a result of user, software, or hardware error, for example, a backup can be used to restore the corrupted data volume back to a consistent data state that existed at the time the backup was created.

Techniques for backing up such data include snapshot (point-in-time copy) backup techniques. A point-in-time copy of data (also referred to as a snapshot), is a copy of a particular set of data, as that set of data existed at a discrete point in time. A point-in-time copy can be created in a manner that requires reduced downtime of the data being copied. For example, a point-in-time copy can initially just refer to the set of data being copied (e.g., using logical structures such as pointers, bitmaps, and/or the like). As that set of data is subsequently modified, the pre-modification values can be copied to the point-in-time copy prior to the original data values being overwritten. Since such point-in-time copies can be created relatively quickly, point-in-time copies can be used as the source of operations such as backups, indexing, and virus scanning in order to reduce the amount of time to which access to the original set of data needs to be restricted.

In response to the aforementioned growth in data, techniques have also been formulated to minimize the amount of storage space consumed by such data, including backups thereof. For example, when creating backups (whatever the backup technique employed), one such technique used to reduce the amount of storage space used to store a given amount of data (e.g., a backup) is deduplication. Deduplication involves identifying duplicate data and storing a single copy of the duplicate data, rather than storing multiple copies. For example, if two identical copies of a portion of data (e.g., a file) are stored on a storage device, deduplication involves removing one of the copies and instead storing a reference to the removed copy. If access to the removed copy is requested, the request is redirected and the reference is used to access the remaining copy. Since the reference is typically relatively small, relative to the copy of the portion of data, the added space used to store the reference is more than offset by the space saved by removing the duplicate copy.

In order to expedite the process of determining whether identical data is already stored, deduplication engines typically divide the data into portion, or segments, and calculate a signature, or fingerprint for each segment. When a segment is stored, the fingerprint that represents the segment can be added to a list of fingerprints representing stored segments. Then, by comparing a segment's fingerprint with the fingerprints included in the listing of fingerprints, the deduplication engine can determine if the segment is already stored. If so, rather than store another copy of the segment, a reference is stored and a reference counter is updated.

Among other issues encountered in the foregoing scenarios, the unused space typically maintained in databases results in inefficiencies in the process of backing up snapshots (e.g., backing up a snapshot backup to a backup storage volume). Further, such unused space also results in inefficiencies when deduplicating the data blocks of such unused space. Approaches that reduce or eliminate such inefficiencies are therefore desirable.

SUMMARY OF THE INVENTION

The present disclosure describes methods, computer program products, computer systems, and the like that provide for the performance of a targeted backup operation. Such a targeted backup operation is performed on a backup that comprises a plurality of data blocks. The data blocks, in turn, comprise an in-use data block and an unused data block. The targeted backup operation comprises performing a backup operation on the in-use data block.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Broadly, the concepts described herein are applicable to scenarios in which a database or other such data storage and management construct is maintained with some amount of unused storage therein, and is subject to backup operations (using one backup technique) that fail to discern between "in use" data blocks (also referred to herein as "in-use data blocks") and "unused" data blocks (also referred to herein as "unused data blocks"). In such scenarios, a mechanism that creates some manner of data structure indicating which portions of a point-in-time copy of data are "in use"/ "unused" can be employed. Such a data structure can then be used to make a determination as to which of the portions should be backed up, based on whether or not the given portion contains "in-use" data. Alternatively, such data blocks can either contain information as to the "in use"/ "unused" status, or can be analyzed in order to make such a determination. A second backup technique, which employs such information and/or analyses, can then perform a backup operation on the existing, original backup in a more effective, efficient manner than would otherwise be the case (e.g., by backing up only the data blocks from the existing backup that were "in use" at the time that the existing backup was made).

Because databases (e.g., a Structured Query Language (SQL) database) typically contain a significant number of "empty" ("unused") data blocks, as noted, backup operations that fail to take this fact into account (for whatever reason) produce backups that include such empty data blocks. In turn, when such backups are then themselves backed up, all the original backup's data must be backed up without regard as to whether the original data blocks were, in fact, "in use" at the time they were backed up (or not, as the case may be). By way of example, a snapshot (or other point-in-time copy) of a database includes all the data blocks allocated to a given database, regardless of whether the data blocks in question are "in use" or "unused", representing a backup of the entire database file without consideration as to the state of its contents (i.e., for purposes of this example, whether its data blocks are "in use" or "unused"). However, through the creation of one or more data structures that maintain information as to the data blocks' "in use"/"unused" status, a determination can be made as to whether or not such data blocks should be backed up from the snapshot. By way of alternative example, such information can be included in the data blocks of the backup, or can be determined by analysis thereof, in order to make a determination as to which data blocks are "in use" and so should be the subject of the subsequent backup operation.

Example Database Backup Architecture

Figure 1:
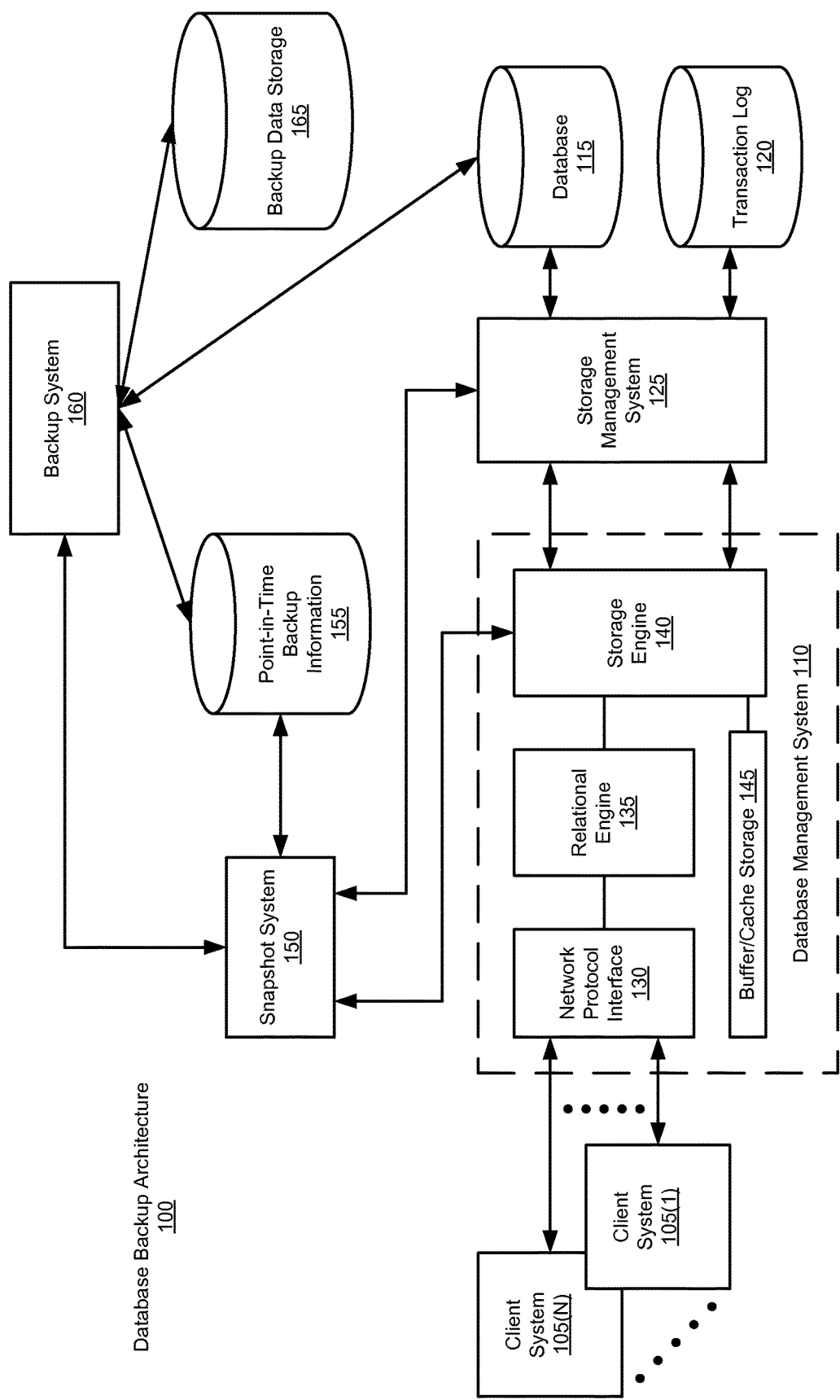
FIG. 1 is a simplified block diagram illustrating an example of a database backup architecture, according to an embodiment.

FIG. 1 is a simplified block diagram illustrating an example of a database backup architecture 100 according to embodiments of systems such as those disclosed herein. In database backup architecture 100, users (e.g., using a client system, such as one of client systems 105(1)-(N)) access a database management system 110 in order to avail themselves of the functionalities provided thereby. In turn, database management system 110 accesses a database 115, while maintaining information regarding transactions regarding database 115 in a transaction log 120. As depicted in FIG. 1, database management system 110 interfaces with database 115 and transaction log 120 via a storage management system 125. Database management system 110 includes a network protocol interface 130, which supports communication between client systems 105(1)-(N) and database management system 110. Network protocol interface 130 supports communications between client systems 105(1)-(N) and a relational engine 135 of database management system 110.

Relational engine 135, also referred to as a query processor, provides functionality related to query optimization and execution, and includes components such as a command parser, a query optimizer, and a query executor. In such a configuration, the command parser manages language events such as checking syntax and generating query plans (or locating existing query plans). In certain embodiments, a query plan will contain details about the manner in which database management system 110 is to go about executing a given piece of code (e.g., a structured query language (SQL) query). In such embodiments, the query optimizer evaluates one or more ways that a given query can be executed, and selects the approach that is determined to be the lowest cost to execute. The query executor, in turn, then executes the query by working through each step thereof, and interacting with a storage engine 140 of database management system 110. Storage engine 140 is responsible for managing input/ output (I/O) to/from database management system 110 with storage management system 125. Storage engine 140 includes instructions for access methods (which handle I/O requests for various elements within the databases being accessed (e.g., database 115)), manages the buffer pool (depicted in FIG. 1 as buffer/cache storage 145), and performs transaction management via a transaction manager that interfaces with storage management system 125 and maintains information regarding such transactions in transaction log 120. Such a transaction manager can provide a number of features, including a lock manager and log manager. Such a lock manager is responsible for providing concurrency in the data accessed, and deliver the requisite level of isolation by way of locking mechanisms. Thus, access method requesting changes can do so without concern as to data corruption. The log manager, in turn, maintains information regarding such changes in a transaction log such as transaction log 120. Storage management system 125 serves as an interface between data management system 110 (and its elements) and the storage systems of database backup architecture 100 (e.g., database 115 and transaction log 120).

As will be appreciated, it is desirable to provide mechanisms for assuring the safety and continuity of data in such database systems, in the event of a catastrophic failure, for example. Thus, database backup architecture 100 also includes a snapshot system 150 that interfaces with database management system 110 (and more particularly, storage engine 140) and database 115 (via storage management system 125). Snapshot system 150 is configured to capture the state of a system (in this case, the state of database 115) at a particular point in time. Thus, snapshot system 150, in capturing the state of database 115, creates a point-in-time backup of the information being saved (depicted, at least in part, as point-in-time backup information 155).

The rationale behind the creation of a point-in-time backup and the mechanisms employed to create such backups is, at least in part, concerned with the fact that a full backup of large amounts of data can take a long time to complete, as noted. Further, the resulting delays (and the unavailability of the system being backed up during such operations) can result in data inconsistency when write operations occur during such backups. In order to safely backup live data without the need for temporarily disabling write access to that data during the backup, a snapshot (point-in-time copy) is made of the data. This can be accomplished, for example, by creating an initial backup of the data and then backing up only that data which has been modified since the last snapshot was taken. In so doing, the snapshot process creates a read-only copy of the given volume and allows snapshot system 150 to access the data without interfering with an application writing to the given area (e.g., data block) in storage.

In certain implementations, the snapshot technique employed may maintain snapshots (point-in-time copies) on a file-by-file basis (referred to herein as "file-based snapshots"). Given that a database will include one or more files, a snapshot thereof that is backed up in a file-based snapshot will include each database file in its entirety (thereby including the data blocks of each, whether "in use" or "unused"). Moreover, in some implementations of file-based snapshots, a snapshot system such as snapshot system 150 creates such filed-based snapshots on the volume on which the data resides. In that case, point-in-time backup information 155 can simply include, for example, meta-data describing the location of the snapshot(s) in question. Alternatively, point-in-time backup information 155 can include the data blocks that are the subject of the backup operation (e.g., snapshot), as well.

Thus, in so doing, snapshot system 150 creates point-in-time copies of the database(s) maintained in database 115, which copies can then be stored in the volume in which the backed-up data is stored or in another storage location (e.g., point-in-time backup information 155). This information can include copies of modified data backed up subsequent to the original snapshot. Also, as noted earlier, while the term "snapshot" is employed variously herein, it is to be appreciated that, in light of the present disclosure, such operations are to be interpreted as any mechanism, construct, and/or operation (or set of operations) that creates a point-in-time copy of the information (e.g., database) that is the object thereof.

Snapshot system 150 performs such operations, in certain embodiments, under the control of a backup system 160. Backup system 160 can be configured not only to control snapshot system 150, but also to backup original backups (e.g., a snapshot of database 115) by creating one or more targeted backups by performing a targeted backup operation, and to store such targeted backups in backups data storage (depicted in FIG. 1 as backup data storage 165). As noted, a database such as database 115 will often contain significant amounts of allocated, but unused, data blocks (e.g., resulting in "empty" (or "unused") data blocks), which are intended to be maintained as data blocks not (yet) in use, in order to reserve space for new rows, and thereby speed new row insertion operations. Unfortunately, when backing up a database such as database 115, the entire database is backed up wholesale, regardless of whether or not any particular portion of the database is "in use". Thus, and particularly with regard to streaming backups, the backing up of such unallocated blocks results in unnecessary consumption of computing resources. While deduplication can ameliorate this problem to some extent, such techniques are somewhat less than effective (e.g., depending on the database's structures and how the "in use" data is stored within those structures). In such a situation, there is no way for a deduplication technique to discern between "in use" data and "unused" data, and thus, such a technique will go through the generation for (and, potentially, the storage of) data blocks that are not "in use" (i.e., are "unused"). Such considerations are particularly problematic in scenarios in which unused data blocks are not homogenous (e.g., not cleared to all zeros), but instead contain old or random data. Because such data blocks may generate fingerprints that differ from those of other data blocks (even though such "unused" data blocks are, in fact, unused), a deduplication technique will proceed with their backup, because such data blocks are viewed as being unique.

However, by taking steps such as maintaining information regarding the "in use"/"unused" status of the data blocks within a point-in-time copy of a given database (or maintaining such information in the data blocks themselves (e.g., being created during their allocation and maintained during their use), or making such a determination by analyzing each such data block), embodiments of systems such as those described herein are able to identify which data blocks of a point-in-time copy of a database need to be backed up, and which of the blocks in that point-in-time copy can be ignored. In so doing, backup and deduplication operations need only concern themselves with processing the data blocks in a snapshot (or other such backup) that were actually "in use" in the database in question at the time the original backup was performed.

Examples of Backup Constructs Usable in Targeted Backup Operations

Figure 2:
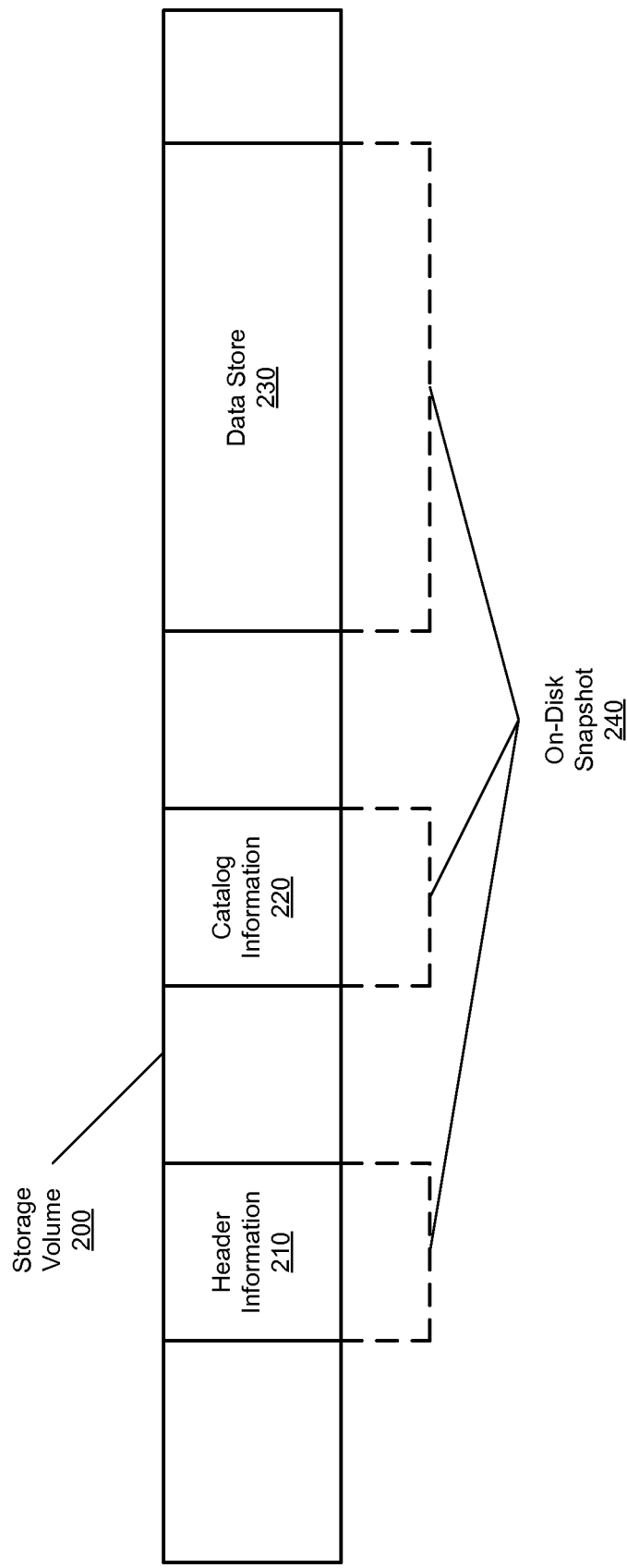
FIG. 2 is a simplified block diagram illustrating an example of the layout of a point-in-time copy, according to an embodiment.

FIG. 2 is a simplified block diagram illustrating an example of the layout of a point-in-time copy, according to embodiments of systems such as those described herein. In the example depicted in FIG. 2, a storage volume 200 is illustrated as including an on-disk snapshot (point-in-time copy) of a database such as that depicted in FIG. 1 as database 115. Storage volume 200 is shown in FIG. 2 as including header information 210, catalog information 220, and a data store 230. Header information 210, catalog information 220, and data store 230 make up, at least in part, an on-disk snapshot 240. In the embodiment depicted in FIG. 2, header information 210 includes information that identified on-disk snapshot 240, identifies the location of catalog information 220, and provides other information pertinent to accessing on-disk snapshot 240. In turn, catalog information 220 includes identifying information, information regarding the location of data store 230 in storage volume 200, as well as other information relevant to the use of on-disk snapshot 240. Similarly, data store 230 includes identifying information, as well as the data backed up from a database such as database 115. Further, either as part of the maintenance of database 115, the operation of snapshot system 150 (and thus as part of point-in-time backup information 155), or as a result of the operation of backup system 160, a data store bitmap is generated and/or maintained, and reflects which of the data blocks of data store 230 are "in use". Such a construct, while referred to herein as a bitmap, can be any data structure capable of maintaining such information. For example, such information can be maintained as single bits (e.g., in a byte code format (and can indicate "in use" and "unused" data blocks)). Alternatively, a set of pointers to stretches of "in use" data blocks could be defined, or any other appropriate mechanism for delineating "in use" data blocks from "unused" data blocks.

Figure 3:
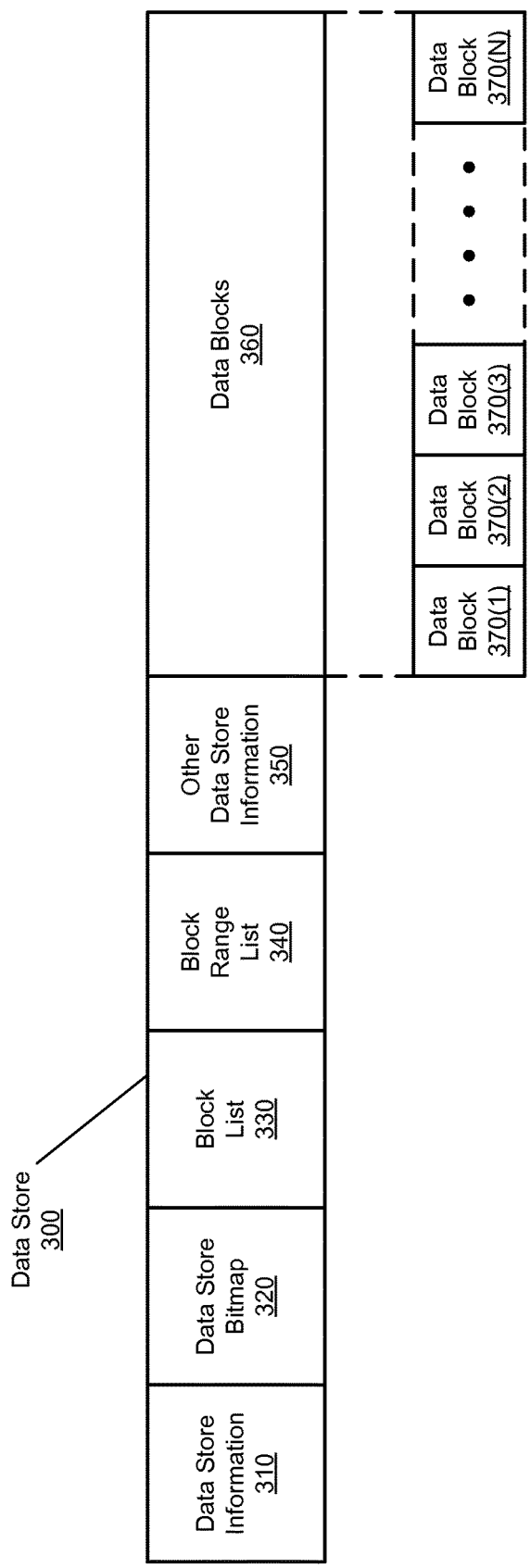
FIG. 3 is a simplified block diagram illustrating an example of a data store, according to an embodiment.

FIG. 3 is a simplified block diagram illustrating an example of a data store (depicted in FIG. 3 as a data store 300), according to embodiments of systems such as those described herein. Data store 300 presents an example of data store 230, in which the internal structure of such a data store is illustrated. Thus, data store 300 includes data store information 310, a data store bitmap 320, a block list 330, a block range list 340, and other information regarding data store 300 (depicted in FIG. 3 as other data store information 350), as well as the information captured in the point-in-time copy made (depicted in FIG. 3 as data blocks 360). Data blocks 360 are further illustrated as including some number of data blocks (depicted in FIG. 3 as data blocks 370(1)-(N)). As will be appreciated in light of the present disclosure, data store 300 may include the data of only a single point-in-time copy, or can include the data from multiple such point-in-time backup operations. Data store information 310 can include a variety of information regarding data store 300, including, for example, information regarding identification of data store 300, the version of software used to create data store 300, types of records backed up in data store 300, information regarding the location of various elements within data store 300, and other such relevant information useful in the maintenance and use of data store 300. Information regarding data store 300 that can be maintained in data store information 310 further includes various attributes of data blocks 360, information regarding the computing system that created data store 300, information regarding computing systems capable of and/or allowed to access data store 300, and the like.

In the embodiment depicted in FIG. 3 (and thus, the architecture creating data store 300), information regarding which of data blocks 360 (i.e., data blocks 370(1)-(N)) contain, at least in part, "in use" data, and which contain "unused" data is maintained in data store bitmap 320. A more detailed example of data store bitmap 320 is presented in FIG. 4, and is discussed in greater detail in connection therewith. Block list 330, in turn, includes information regarding the data block ranges used by the point-in-time copy (or copies) stored in data blocks 360. Block list 330 can also include information regarding a description of the blocks making up data blocks 360 (e.g., data blocks 370(1)-(N), including the type of one or more of the blocks, the relationship between the information in data blocks 360, information regarding access data blocks 360, and the like. Block range list 340 includes information regarding the data block ranges used by data blocks 360. Other data store information 350 can include additional information, such as information regarding the manner in which the data blocks of data blocks 360 are ready, recovery information (in the case of data corruption), and other such relevant information.

In certain embodiments, information (not shown) regarding a given data block's "in use"/"unused" status is maintained within in the data block itself. Storage for such status information can be created within the data block during the data block's allocation, and maintained during its use (e.g., as a flag that begins by being cleared (at allocation), set when the data block is "in use", and cleared if/when the data block becomes "unused"). In such a scenario, each data block can be checked as it is read, and a backup decision appropriate to its "in use"/"unused" status made. Using such an approach, it is preferable to store such "in use"/"unused" status information in a position within each data block that facilitates fast, efficient access thereto. For example, such "in use"/"unused" status information can be stored at the beginning of the data block, in order to allow such information to be read first when accessing the data blocks in serial fashion. Alternatively in this regard, other data store information 350 can be designed to include pointers or other such constructs to allow for fast, efficient access thereto. These and other alternatives will be apparent to one of skill in the art in light of the present disclosure, and are intended to come within the scope of this description.

Figure 4:
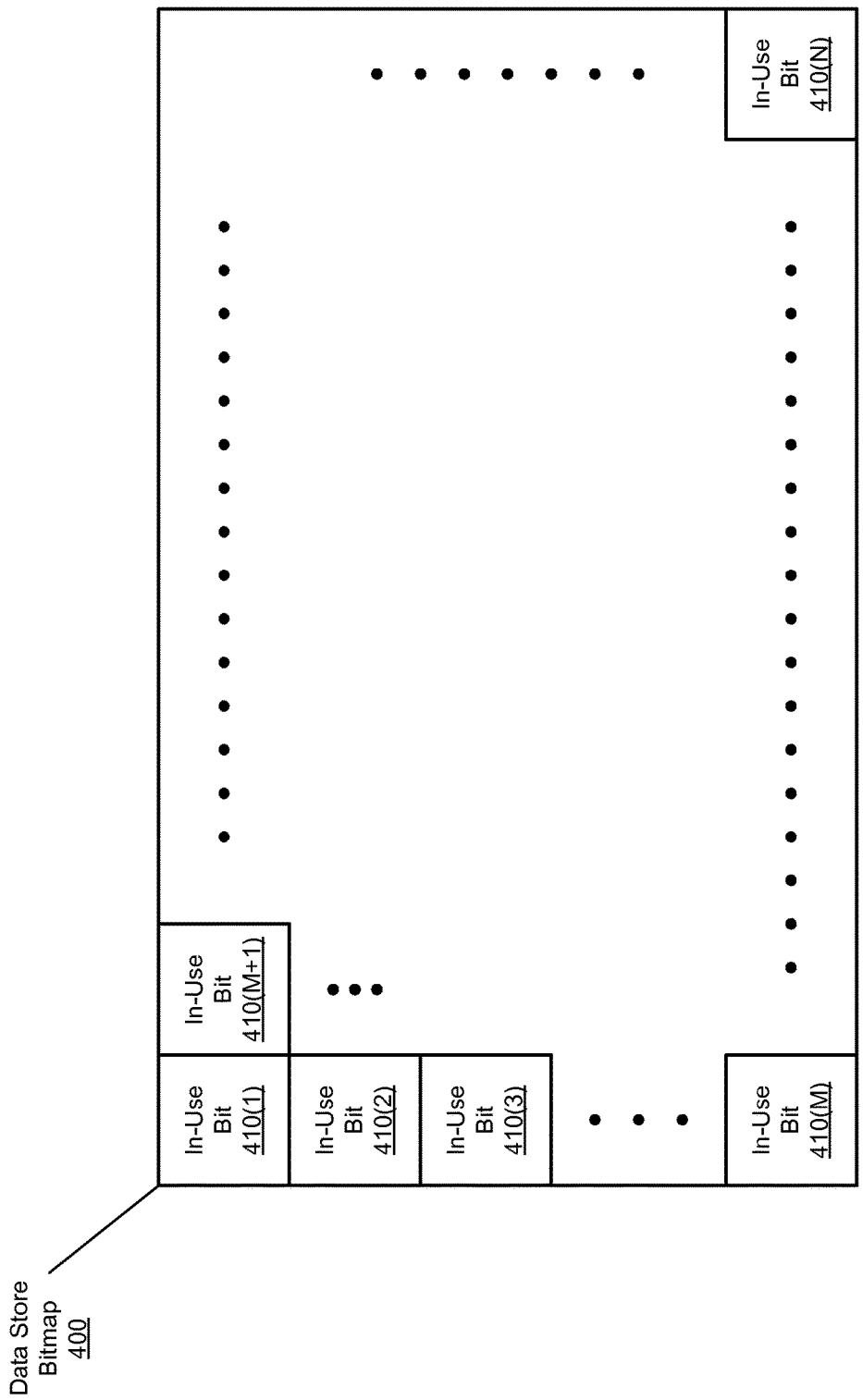
FIG. 4 is a simplified block diagram illustrating an example of a data store bitmap, according to an embodiment.

FIG. 4 is a simplified block diagram illustrating an example of a data store bitmap, such as data store bitmap 320, according to embodiments of systems such as those described herein. FIG. 4 thus depicts a data store bitmap 400, in the manner of data store bitmap 320. Data store bitmap 400 includes a number of bits, depicted in FIG. 4 as in-use bits 410(1)-(N). In-use bits 410(1)-(N) each indicate whether a corresponding one of the data blocks in a data store (e.g., data blocks 370(1)-(N) of data store 300 are "in use" or, in fact, "unused". As will be appreciated in light of the present disclosure, from a conceptual standpoint, in-use bits 410(1)-(N) are a string of bits, each of which indicates whether a corresponding data block is "in use" by way of being sent (e.g., to a logical "one") or "unused" (e.g., logically cleared ("0")). As depicted in FIG. 4, in-use bits 410(1)-(N) are shown as one might expect them to appear in a data structure (e.g., in a byte-wise configuration), in which case in-use bits 410(1)-(M) might represent one byte's worth of in-use bits (where M equals 8), although a variety of alternatives exist in this regard, will be apparent in light of the present disclosure. In another example, where M equals 32 (or 64), a row of in-use bits can implement a pointer to a data block that is presently "in use". Further still, multiple such pointers can be used to define ranges of data blocks that are "in use" (and/or "unused"). By using such an approach, not only can processes such as those described herein be made more efficient, but the storage consumed by data store bitmap 400 can be reduced (particularly where long strings of "in use" or "unused" data blocks exist in the original backup (e.g., snapshot)).

Examples of Targeted Database Backup Processes

Figure 5:
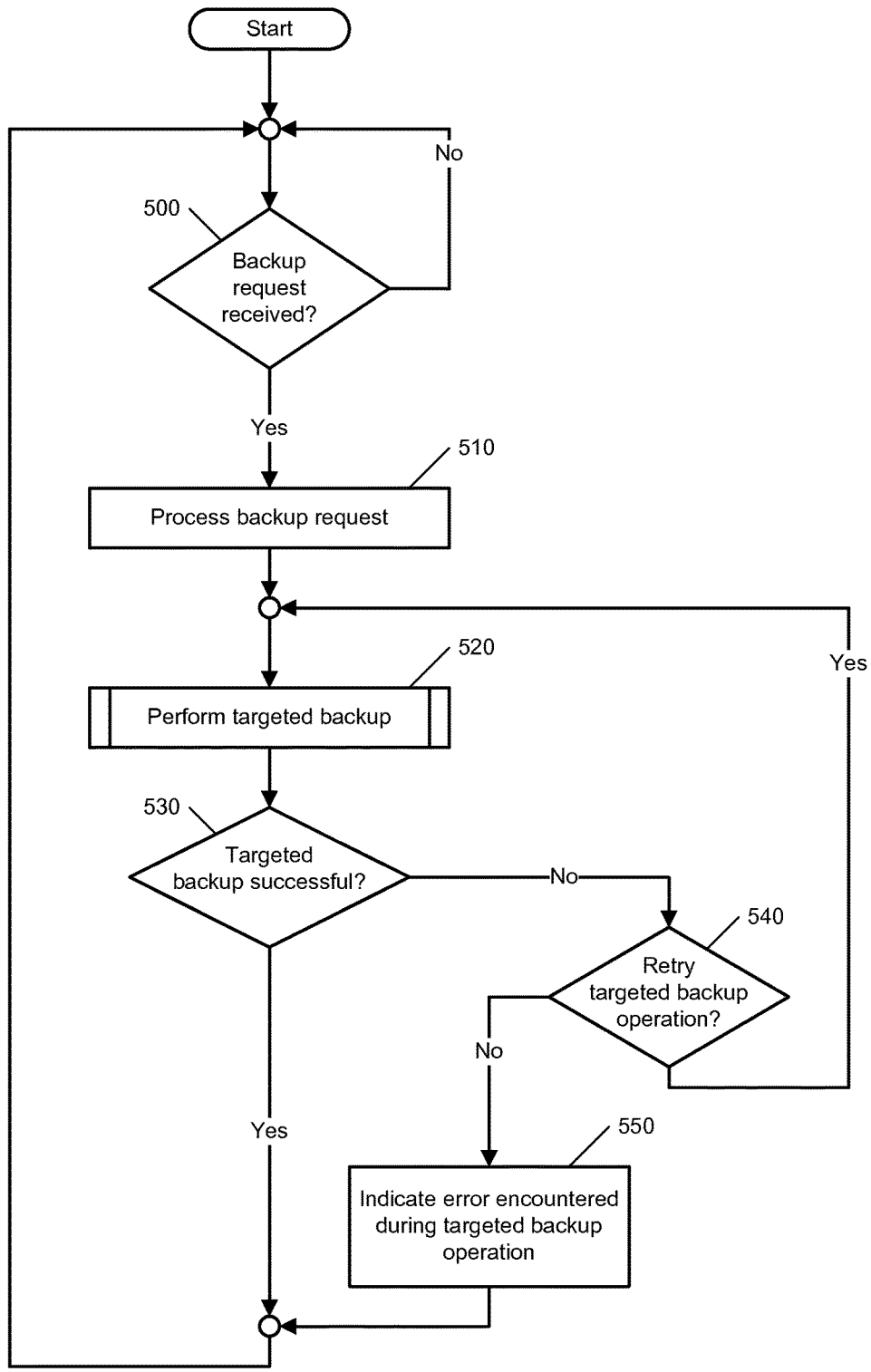
FIG. 5 is a simplified flow diagram illustrating an example of a process of performing a targeted backup, according to an embodiment.

FIG. 5 is a simplified flow diagram illustrating an example of a process of performing a targeted backup, according to embodiments of systems such as those described herein. The process begins with a backup system such as backup system 160 of FIG. 1 awaiting the receipt of a request to backup an original backup (e.g., a snapshot; i.e., a request for a targeted backup) (step 500). While no such request is received, the process loops, awaiting receipt thereof (step 500). Once a request for targeted backup has been received (step 500), the backup system processes the backup request (step 510). At this juncture, the backup system sets into motion a targeted backup process (step 520). The operations performed in effecting a targeted backup are discussed in greater detail in connection with the operations depicted in FIG. 6.

A determination is then made as to whether the targeted backup performed was successful (step 530). If the targeted backup was successful (step 530), the process returns to awaiting the next request for a targeted backup to be performed (step 500). Alternatively, if the targeted backup was not successful (step 530), a determination is then made as to whether or not to retry the targeted backup operation (step 540). If this determination indicates that the targeted backup operation should be retried (step 540), the process loops back and attempts to again perform the targeted backup operation (step 520). However, if the targeted backup was not successful (step 530) and this targeted backup operation is not to be retried (step 540), the backup system indicates (e.g., to a system administrator) that an error was encountered during the targeted backup operation (step 550).

Figure 6:
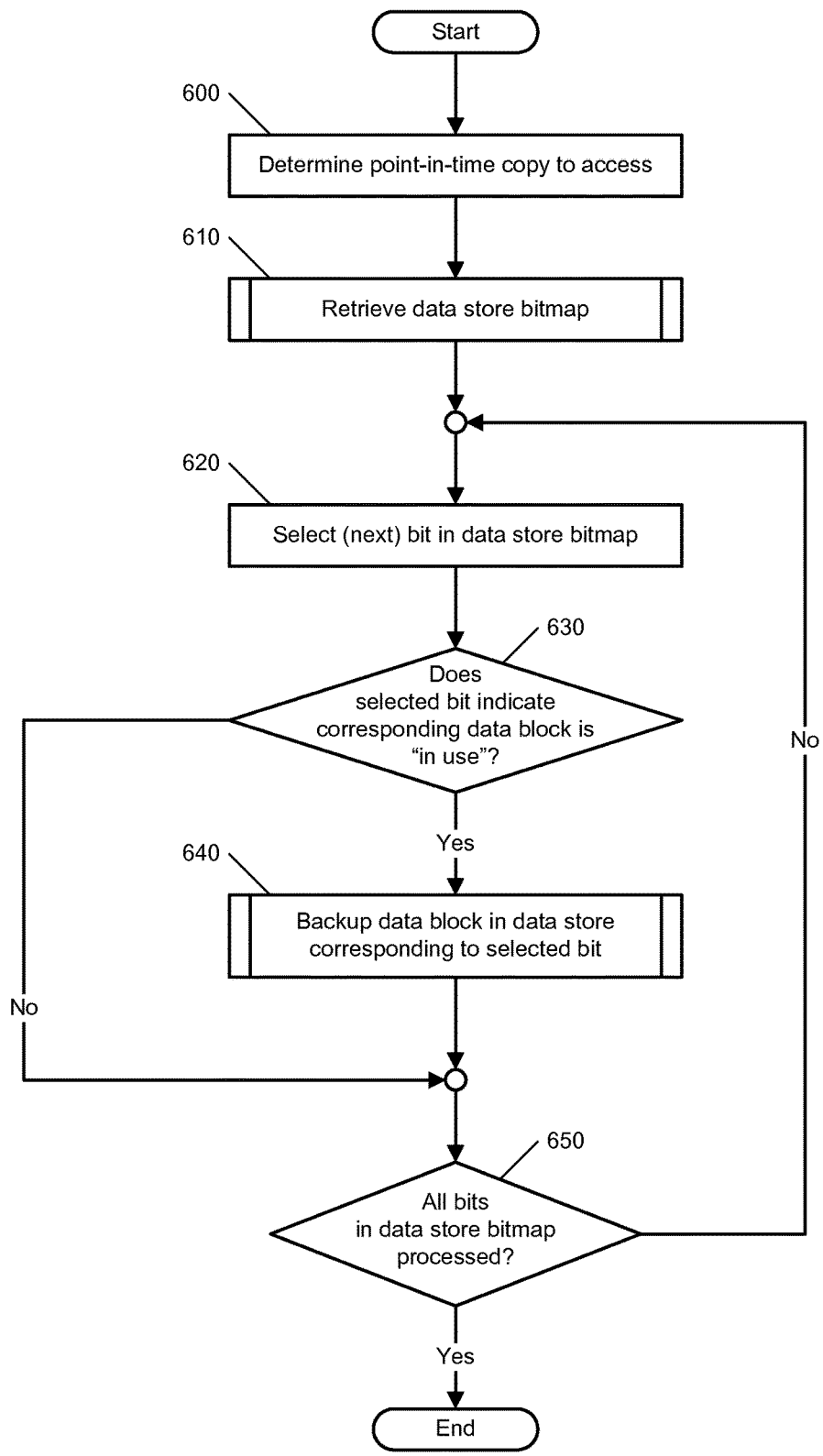
FIG. 6 is a simplified flow diagram illustrating an example of the operations involved in performing a targeted backup, according to an embodiment.

FIG. 6 is a simplified flow diagram illustrating an example of the operations involved in performing a targeted backup, according to embodiments of systems such as those described herein. As will be appreciated, the process depicted in FIG. 6 is an example of the targeted backup operation discussed in connection with step 520 of FIG. 5. In the example depicted in FIG. 6, the process begins with a determination as to which point-in-time copy is to be accessed (and thus, backed up) (step 600). Once the desired point-in-time copy is identified (step 600), the data store bitmap of the point-in-time copy is retrieved (step 610). An example of the operations involved in retrieving a data store bitmap (e.g., such as that depicted in FIGS. 3 and 4) are described in greater detail in connection with the discussion of FIG. 7. As will be appreciated in light of the present disclosure, however, such a data store bitmap can be accessed "in place" (e.g., the requisite bit(s) of the data store bitmap simply read from the data store bitmap as needed, rather than all at once).

Once the snapshot's data store bitmap has been retrieved (step 610), a bit in the data store bitmap is selected to begin the determination as to whether or not the corresponding data block should be backed up (step 620). It will be appreciated that, typically, the bits in the data store bitmap are selected in a serial fashion, starting with the first bit in the data store bitmap, and proceeding through the data store bitmap to the last bit therein, though this need not be the case. In terms of data store bitmap 400 of FIG. 4, then, the process depicted in FIG. 6 begins with in-use bit 410(1), and proceeds through in-use bits 410(1)-(N), until reaching the end of data store bitmap 400 at in-use bit 410(N). Thus, for each such bit, the process of FIG. 6 makes a determination as to whether the selected bit indicates that the corresponding data block is "in use" (step 630).

Proceeding in such serial fashion, if the determination performed indicates that the data block corresponding to the selected bit is, in fact, "in use" (step 630), the data block corresponding to the selected bit is backed up from the data store to backup storage (step 640). However, if the determination made indicates that the data block corresponding to the selected bit is "unused" (i.e., not "in use") (step 630), the corresponding data block is not backed up, and in effect, is ignored. A determination is then made as to whether all bits in the data store bitmap (or desired portion thereof) have been processed (step 650), indicating that the requisite data blocks of the data store (e.g., the requisite ones of data blocks 370(1)-(N) of data store 300) have been backed up. Once all (or at least, the requisite) bits in the data store bitmap (and their corresponding data blocks) have been processed (step 650), the process concludes.

While the process of FIG. 6 is illustrated as performing the aforementioned determinations for each such data block backup operation, it will be appreciated in light of the present disclosure that, as an alternative example such a process could proceed serially through the bits of the data store bitmap looping until a bit value indicating that a corresponding data block is "in use" and thus should be backed up. Strings of bits in the data store bitmap indicating corresponding data blocks are "in use" (or are "unused") can thus be processed (ignored) accordingly. Further, while the process of FIG. 6 is described in terms of using a bitmap, other data structures can be used in the alternative and/or in combination therewith, as noted elsewhere herein. Further still, in light of the present disclosure, it will be appreciated that, rather than using such constructs, the data blocks can be analyzed (e.g., on a block-by-block basis, by aggregating such data blocks into groups for analysis, or on some other basis, as well as by way of some combination thereof), and a decision as to whether to backup the given data blocks made on that basis. Further yet, such information can be included in the data blocks themselves, in order to facilitate their analysis in this regard. These and other alternatives will be apparent to one of skill in the art in light of the present disclosure, and are intended to come within the scope of this description.

Figure 7:
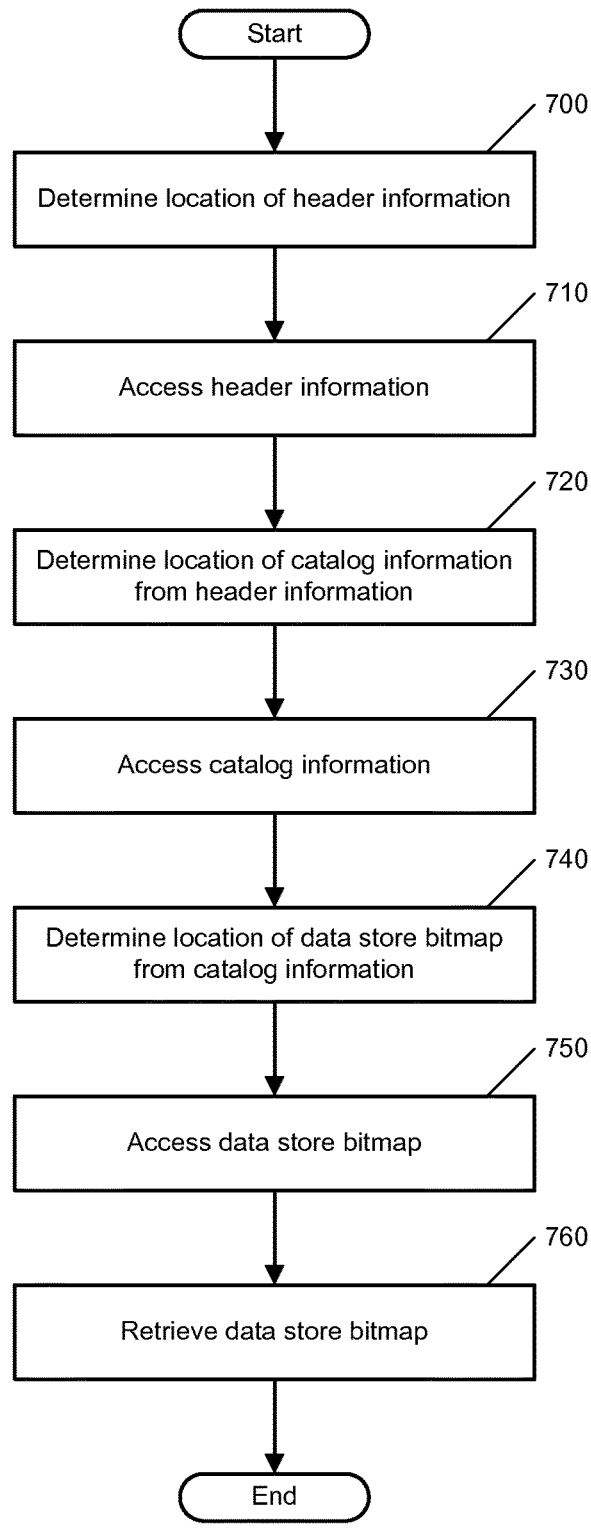
FIG. 7 is a simplified flow diagram illustrating operations performed in retrieving a data store bitmap, according to an embodiment.

FIG. 7 is a simplified flow diagram illustrating an example of operations performed in retrieving a data store bitmap, according to embodiments of systems such as those described herein. A process such as that depicted in FIG. 7 can be use, for example, to retrieve a data store bitmap from an on-disk snapshot (point-in-time copy) such as on-disk snapshot 240 of FIG. 2, and more specifically, with regard to a data store such as data store 300 of FIG. 3.

This example of a process to retrieve a data store bitmap begins with a determination as to the location of header information for the given point-in-time copy (step 700). Once the location of the point-in-time copy's header information is determined (step 700), the header information is accessed (step 710) and a determination is made as to the location of catalog information based on this header information (step 720). Once the location of the point-in-time copy's catalog information is determined from the point-in-time copy's header information (step 720), the catalog information is accessed (step 730) and, using this catalog information, a determination is made as to the location of the data store bitmap within the data store (step 740). As will be appreciated in light of FIGS. 2 and 3 (and their related descriptions), header information (e.g., header information 210) provides the location of catalog information (e.g., catalog information 220), which, in turn, provides information as to the location of the data store in question (e.g., data store 230). Other, equally-preferable alternatives to such structures will be apparent in light of the present disclosure, however. Within the data store, information (e.g., data store information 310) can be used to identify the location of the data store bitmap to be retrieved (e.g., data store bitmap 320). At this juncture, having identified the location of the data store bitmap in question (step 740), the data store bitmap is accessed (step 750) and the data store bitmap retrieved (step 760).

Figure 8:
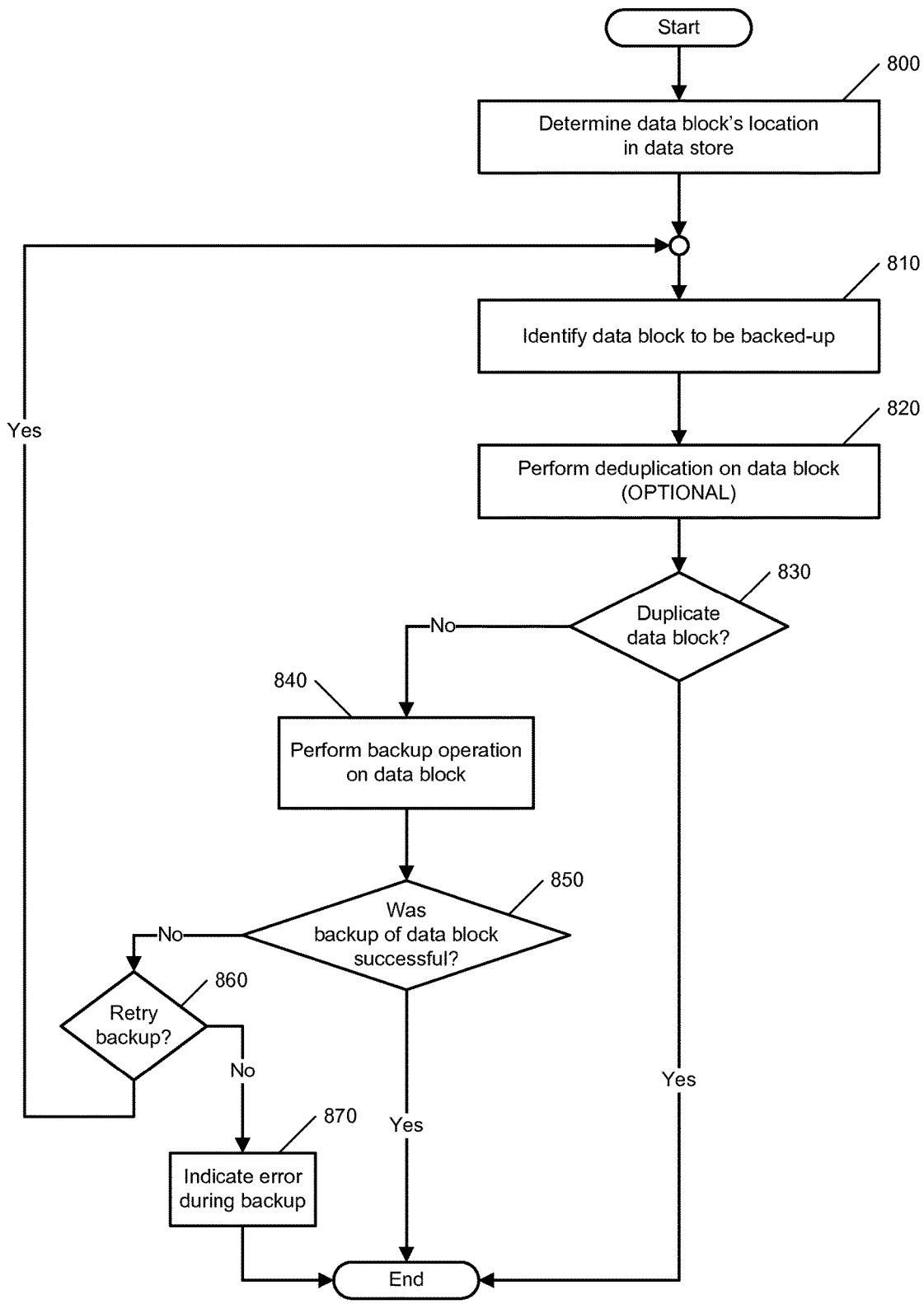
FIG. 8 is a simplified flow diagram illustrating the operations involved in an example of performing a targeted backup, according to an embodiment.

FIG. 8 is a simplified flow diagram illustrating an example of operations involved in one example of performing a targeted backup, and more specifically performing a backup of an "in use" data block (as indicated by its corresponding bit in a data store bitmap), according to embodiments of systems such as those described herein. For example, the process depicted in FIG. 8 can be performed to effect the backup of an "in use" data block in the manner described in connection with step 640 of FIG. 6.

The process of backing up an "in use" data block, in the example depicted in FIG. 8, begins with a determination as to the "in use" data block's location in the given data store (step 800). Once the location of the data block in question has been determined (step 800), the data block to be backed up is identified (step 810). At this juncture, deduplication can be performed on the data block (step 820), although deduplication of data blocks at this point is optional. If the "in use" data block in question is to be deduplicated (step 820), a determination is made as to whether the "in use" data block is a duplicate of another "in use" data block that has already been backed up (step 830). Such a determination can be made, for example, by generating a fingerprint or other unique value that can be used to identify whether or not the contents of the data block currently being considered for back match those of a data block which has already been backed up. If the "in use" data block being deduplicated (and/or otherwise analyzed) indicates that the "in use" data block is indeed a duplicate (step 830), the process concludes, there being no need to back up the current (duplicate) "in use" data block.

Alternatively, if the current "in use" data block is not a duplicate (step 830) or such deduplication is not performed, a backup operation is performed on the current "in use" data block (step 840). In terms of the elements depicted in FIG. 1, such operations can be viewed as backup system 160, having identified an "in use" data block as not being a duplicate (or, in the case in which deduplication is not performed, the "in use" data block in question being destined for backup), backing up the "in use" data block from point-in-time backup information 155 to backup data storage 165, for example. Alternatively, backup system 160 can use point-in-time backup information 155 to retrieve data blocks from an in-volume snapshot of database 115 and copy them to backup data storage 165. As will be appreciated in light of the present disclosure, then, such an "in use" data block may also exist in other storage, for example, such as in the volume in which database 115 is maintained. These and other alternatives will be apparent to one of skill in the art in light of the present disclosure, and are intended to come within the scope of this description.

Once the requisite backup operation has been performed on the "in use" data block (step 840), a determination is made as to whether the backup of the "in use" data block was successful (step 850). If this backup operation was successful (step 850), the process can then conclude. However, if an error occurs in this backup operation (step 850), a determination can be made as whether to retry the backup operation (step 860). If the backup operation is to be retried (step 860), the process of backing up the "in use" data block in question loops back to the identification of the data block to be backed up (step 810). Otherwise, if the backup operation is not to be retried (step 860), an indication is made (e.g., by the backup system to a system administrator) (step 870), and the process once again concludes. As will be appreciate in light of the present disclosure, a process such as that depicted in FIG. 8 can be designed, in the alternative, such that error handling is performed only for data blocks experiencing such errors, while backing up other "in use" data blocks (not encountering such problems) in the normal course.

Figure 9:
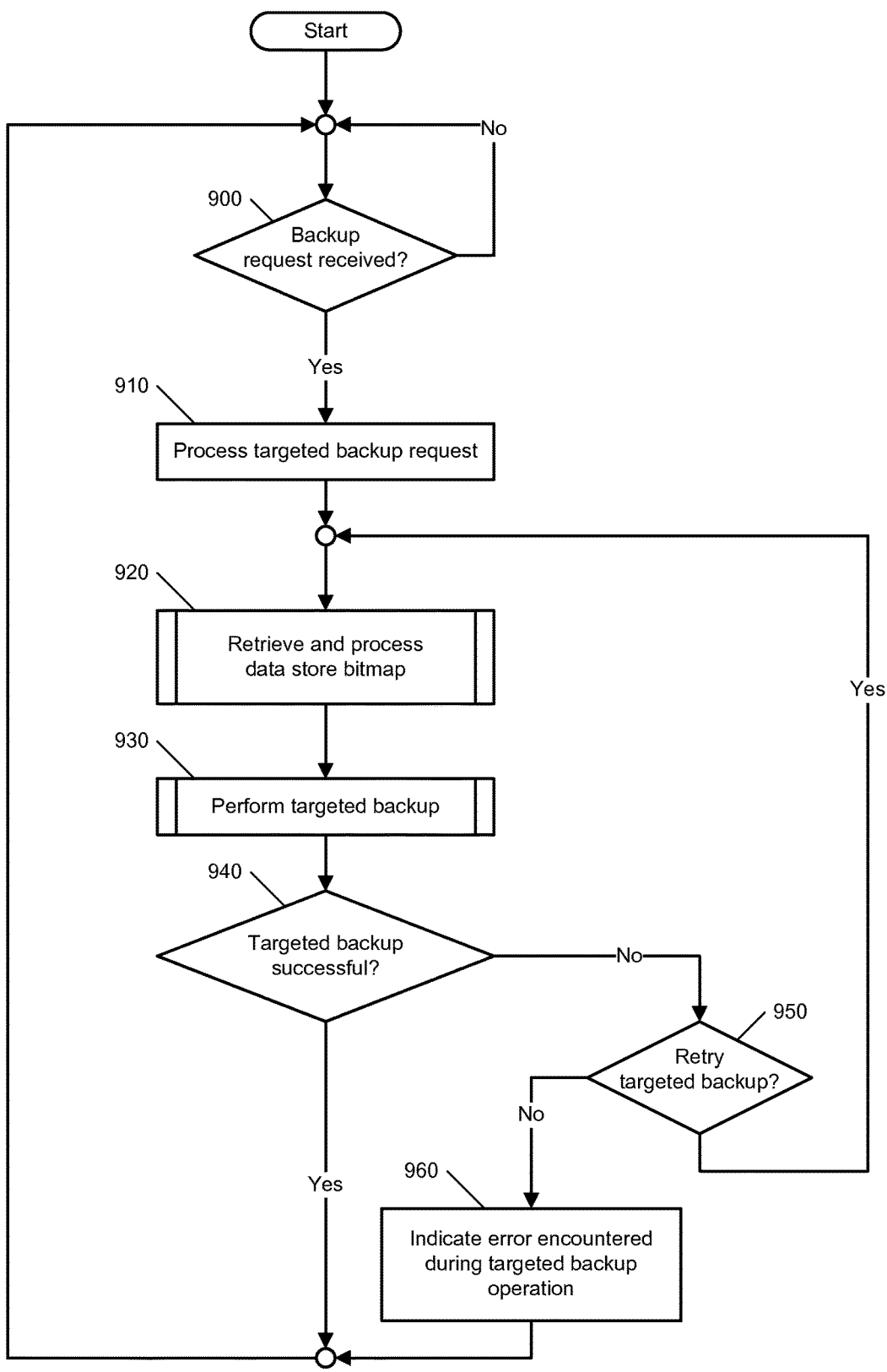
FIG. 9 illustrates a simplified flow diagram of an example process for performing a targeted backup, according to an embodiment.

FIG. 9 illustrates a simplified flow diagram of an example process for performing a targeted backup, according to embodiments of systems such as those described herein. In the manner of the process described in connection with FIG. 5, the process of FIG. 9 begins with a backup system or similar construct awaiting the receipt of a request to backup an original backup (e.g., a snapshot) (step 900). While no such request is received by the backup system (step 900), the process loops, awaiting such receipt. Once a request to perform a targeted backup has been received (step 900), the targeted backup request is processed (step 910). Once the request for a targeted backup has been processed (step 910), the requisite data store bitmap is retrieved and processed (step 920). As has been noted elsewhere herein, the term "data store bitmap" is used herein simply as an example of the type of construct that can be used to store the relevant information regarding the "in use"/"unused" status of the data blocks in a given data store. The process of retrieving and processing a data store bitmap is discussed in greater detail in connection with the description of FIG. 10.

Once the requisite data store bitmap has been retrieved and processed (step 920), a targeted backup is performed (step 930). An example of the manner in which a targeted backup can be performed is discussed in greater detail in connection with FIG. 11. Once the process of performing a targeted backup has completed (step 930), a determination is made as to whether the targeted backup was indeed successful (step 940). If the targeted backup was successful (step 940), the process can simply conclude. Alternatively, if the targeted backup was not successful (step 940), a determination is made as to whether the backup system should attempt to perform the targeted backup operation once again (step 950). If the backup system is to re-dash attempt the targeted backup operation (step 950), the process loops back to the retrieval and processing of the data store bitmap (step 920), as depicted in FIG. 9. As will be appreciated in light of the present disclosure, however, the portions of the targeted backup process depicted in FIG. 9 performed in such a scenario can vary with the needs at hand. Should attempts to perform the targeted backup continue to be unsuccessful (step 940), or such operations are otherwise not to be retried (step 950), the backup system, for example, indicates that an error was encountered during the targeted backup operation (e.g., to a system administrator) (step 960). The process can then conclude.

Figure 10:
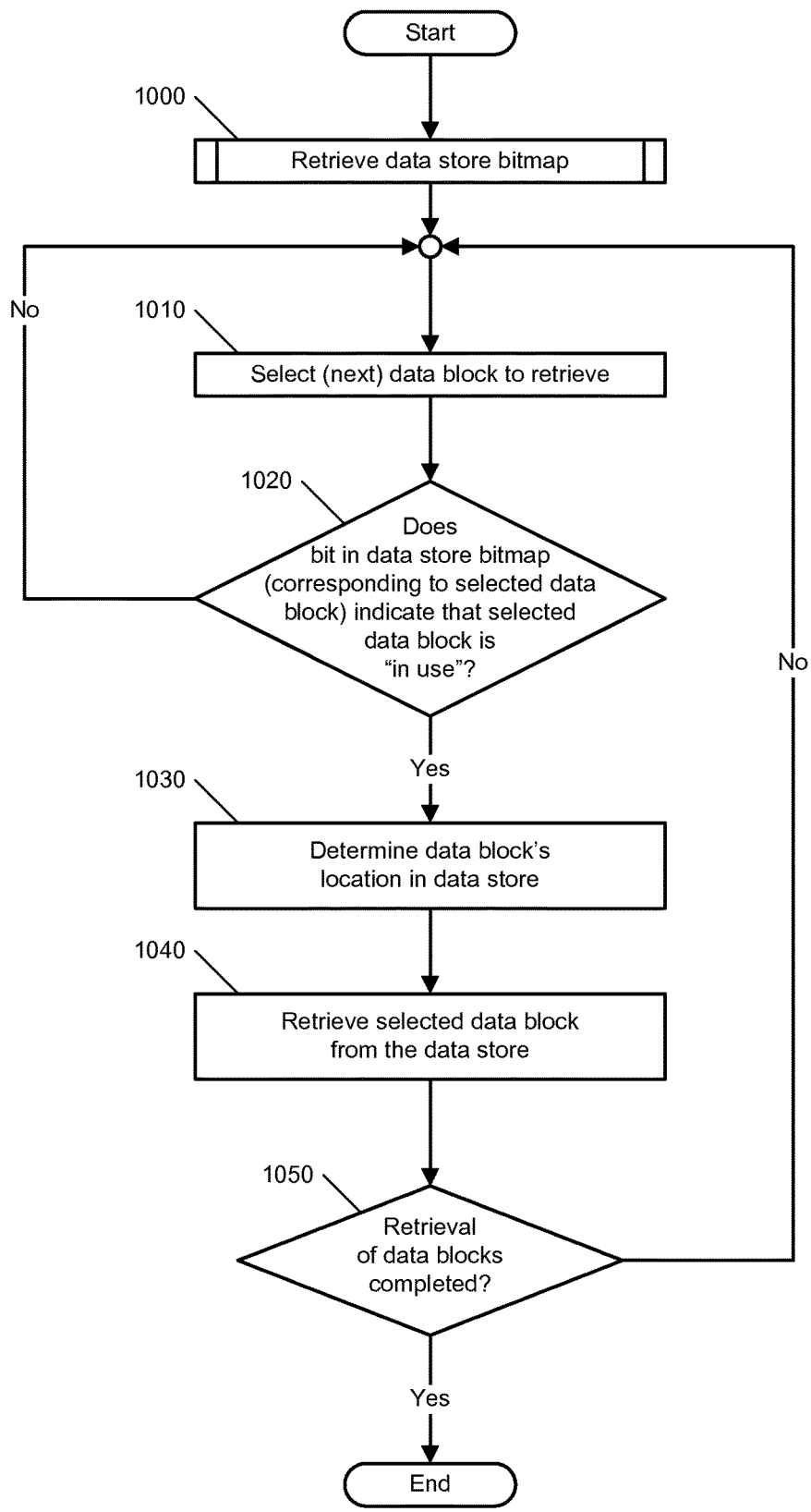
FIG. 10 is a simplified flow diagram depicting a process for retrieving and processing a data store bitmap, according to an embodiment.

FIG. 10 is a simplified flow diagram depicting an example of a process for retrieving and processing a data store bitmap, in the manner suggested with regard to step 920 of FIG. 9, according to embodiments of systems such as those described herein. The process of FIG. 10 begins with the retrieval of the data store bitmap in question (step 1000). Such a process can be performed, in certain embodiments, in the manner of the data store bitmap retrieval process depicted in FIG. 7, for example. Once the requisite data store bitmap has been retrieved (step 1000), next, information from the data store in question (e.g., data store information 310, block list 330, block range list 340, and possibly other data store information (e.g., other data store information 350) of FIG. 3) is analyzed to identify the (next) data block to be considered (step 1010). At this juncture, the data store bitmap retrieved is examined in order to determine whether the bit corresponding to the data block in question indicates whether or not the data block is "in use" (step 1020). If the bit in the data store bitmap corresponding to the data block indicates that the data block is not "in use", the process loops back to the operation(s) in which the next data block is identified (step 1010). However, if the bit in the data store bitmap indicates that the data block in question is indeed "in use" (step 1020), a determination is made as to the data block's location in the data store (step 1030). Once the location of the data block to be backed up has been determined (step 1030), the data block thus selected is retrieved from the data store (step 1040). This process continues until the requisite "in use" data blocks have been retrieved (step 1050). At this point, the process concludes.

Figure 11:
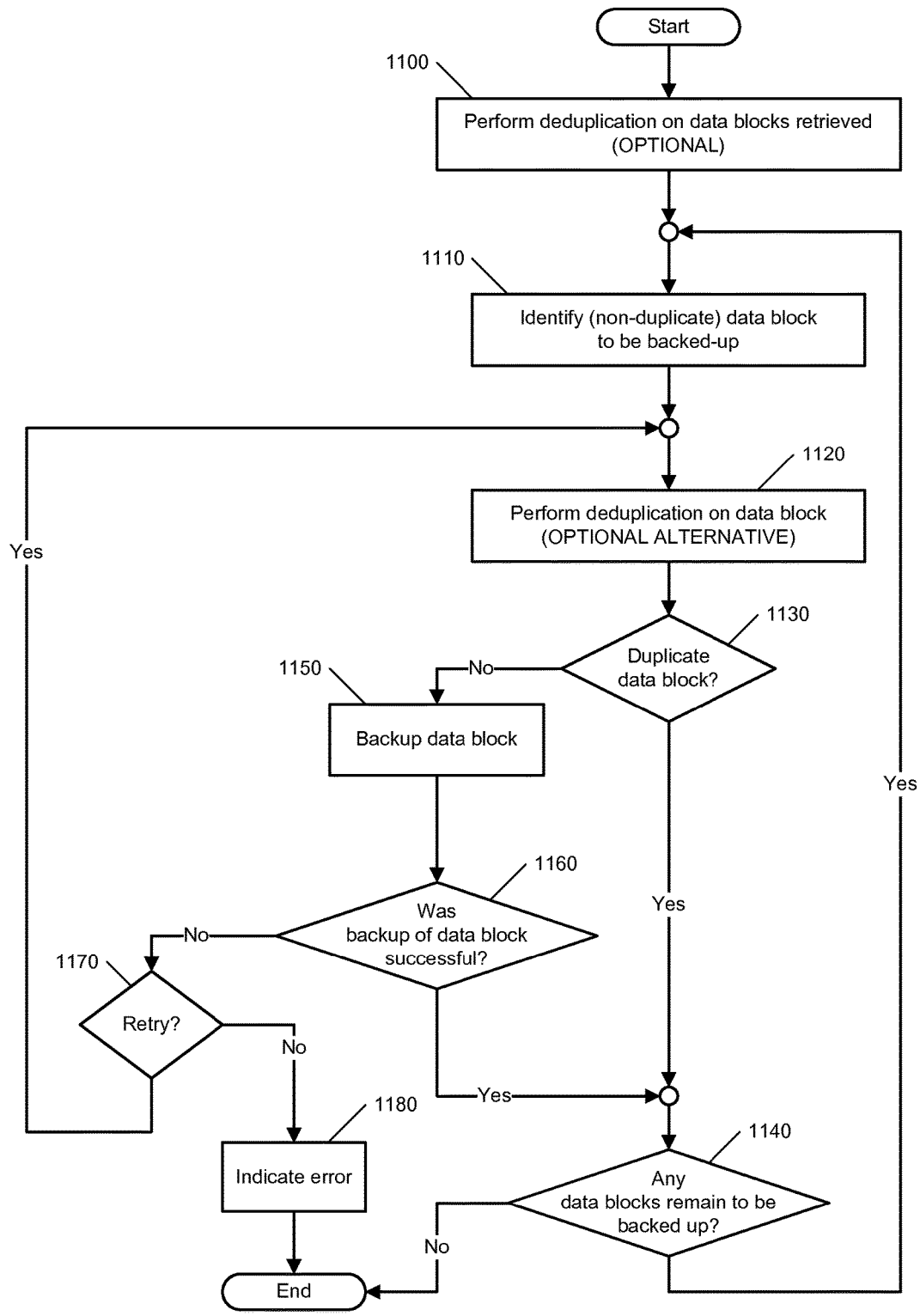
FIG. 11 is a simplified flow diagram illustrating examples of the operations performed in effecting a targeted backup, according to an embodiment.

FIG. 11 is a simplified flow diagram illustrating an example of the operations performed in effecting a targeted backup, such as that discussed in connection with step 930 of FIG. 9, according to embodiments of systems such as those described herein. The process of performing a targeted backup according to the example depicted in FIG. 11 begins (optionally) with the deduplication of data blocks that have been retrieved using the data store bitmap discussed in connection with FIG. 9, for example (step 1100). As noted, deduplication of the data blocks retrieved (e.g., using the information from, for example, the bits of a data store bitmap) can be performed in a number of ways. In the scenario depicted in FIG. 11, in fact, being that the "in use" data blocks have been retrieved from the data store, any deduplication performed will thus be performed only on "in use" data blocks, in the scenario depicted in FIG. 11. As will be appreciated in light of the present disclosure, however, such deduplication operations are performed in a much more efficient manner because the data blocks thus deduplicated are only those which are "in use", regardless of the particular deduplication technique employed. As will further be appreciated in light of the present disclosure, deduplication of these "in use" data blocks is, in fact, optional, and can even be performed on the resulting backup information, once the targeted backup has been performed.

The data blocks retrieved using the data store bitmap, having optionally been deduplicated (step 1100), the data blocks can now be backed up to backup storage (e.g., by way of a backup system such as backup system 160, to backup storage such as backup data storage 165). The process of backing up such "in use" (optionally deduplicated) data block begins with the identification of one of the data blocks to be backed up (step 1110). If deduplication has not been performed on the data blocks retrieved using the data store bitmap, as described in connection with step 1100, the data blocks can be deduplicated on a case-by-case basis (step 1120), as an alternative option to the deduplication discussed earlier. If such optional alternative deduplication is to be performed, a determination is then made as to whether the data block in question is indeed a duplicate data block (step 1130), which can be accomplished by way of generating a fingerprint or other comparable value, and comparing that information to an existing set of fingerprints (or other comparable value) and thus determining whether the data block in question is in fact a duplicate of a datablock backed up earlier. If the aforementioned determination indicates that the data block in question is a duplicate (step 1130), the process of backing up the data block in questions then proceeds to a determination as to whether further such data blocks remain to be backed up (step 1140). If further data blocks remain to be backed up (step 1140), the process proceeds to the identification of the next data block to be backed up (step 1110). Alternatively, if no further data blocks remain to be backed up (step 1140), the process concludes.

In the case in which the data block in question is not a duplicate (step 1130) (or no such determination is to be made), a backup operation is performed on the data block in question (step 1150). A determination is then made as to whether the backup of the data block in question was successful (step 1160). If the data block's backup was successful (step 1160), a determination is made as to whether further data blocks remain to be backed up (step 1140). As before, if additional data blocks remain to be backed up (step 1140), the process proceeds to the identification of the next data block to be backed up (step 1110). Alternatively, if no further data blocks remain to be backed up (step 1140), the process concludes.

However, if the backup of the data block in question was not successful (step 1160), a determination is made as to whether the backup of the data block should be retried (step 1170). If the backup system is to retry the backup operation on the data block in question (step 1170), the process loops to, for example, performing deduplication on the data block in question (step 1120), and, potentially, backing up the data block (step 1150). Alternatively, if such a backup attempt is not to be made (step 1170) the backup system indicate (e.g., to a system administrator) that an error occurred during the backup of the given data block (step 1180). As before, the error having been indicated (step 1180), the process concludes. As noted in connection with FIG. 8, a process such as that depicted in FIG. 11 can be designed, in the alternative, such that error handling is performed only for data blocks experiencing such errors, while backing up other "in use" data blocks (not encountering such problems) in the normal course.

In the manner noted earlier, while the processes of FIGS. 9, 10, and 11 are illustrated as performing the aforementioned determinations for each data block, it will be appreciated in light of the present disclosure that, as an alternative example, such a process could proceed serially through the bits of the data store bitmap looping until a bit value indicating that a corresponding data block is "in use" and thus should be backed up. Strings of bits in the data store bitmap indicating corresponding data blocks are "in use" (or are "unused") can thus be processed (or ignored) accordingly. Further, while these processes are described in terms of using a bitmap, other data structures can be used in the alternative and/or in combination therewith, as noted elsewhere herein. Further, in light of the present disclosure, it will be appreciated that, rather than using such constructs, the data blocks can be analyzed (e.g., on a block-by-block basis, by aggregating such data blocks into groups for analysis, or on some other basis, as well as by way of some combination thereof), and a decision as to whether to backup the given data blocks made on that basis. These and other alternatives will be apparent to one of skill in the art in light of the present disclosure, and are intended to come within the scope of this description.

An Example Computing and Network Environment

As shown above, the systems described herein can be implemented using a variety of computer systems and networks. Examples of such computing and network environments are described below with reference to FIGS. 12 and 13.

Figure 12:
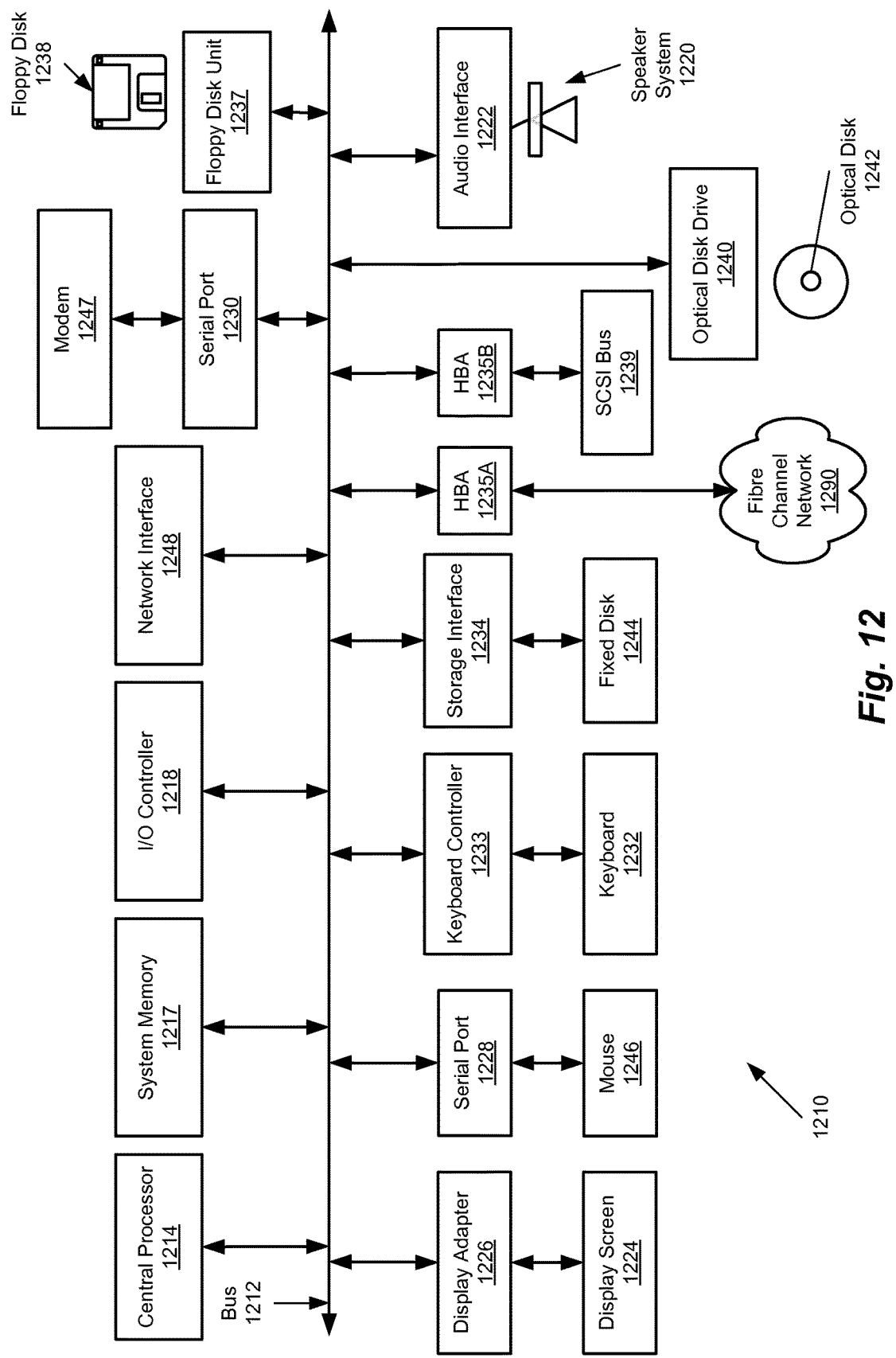
FIG. 12 is a block diagram depicting a computer system suitable for implementing embodiments of the systems described herein.

FIG. 12 depicts a block diagram of a computer system 1210 suitable for implementing aspects of the systems described herein. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1210 are generally stored on and accessed from a computer-readable storage medium, such as a hard disk drive (e.g., fixed disk 1244), an optical drive (e.g., optical drive 1240), a floppy disk unit 1237, or other computer-readable storage medium.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the systems described herein. The devices and subsystems can be interconnected in different ways from that shown in FIG. 12. The operation of a computer system such as that shown in FIG. 12 is readily known in the art and is not discussed in detail in this application. Code to implement the modules of the systems described herein can be stored in computer-readable storage media such as one or more of system memory 1217, fixed disk 1244, optical disk 1242, or floppy disk 1238. The operating system provided on computer system 1210 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
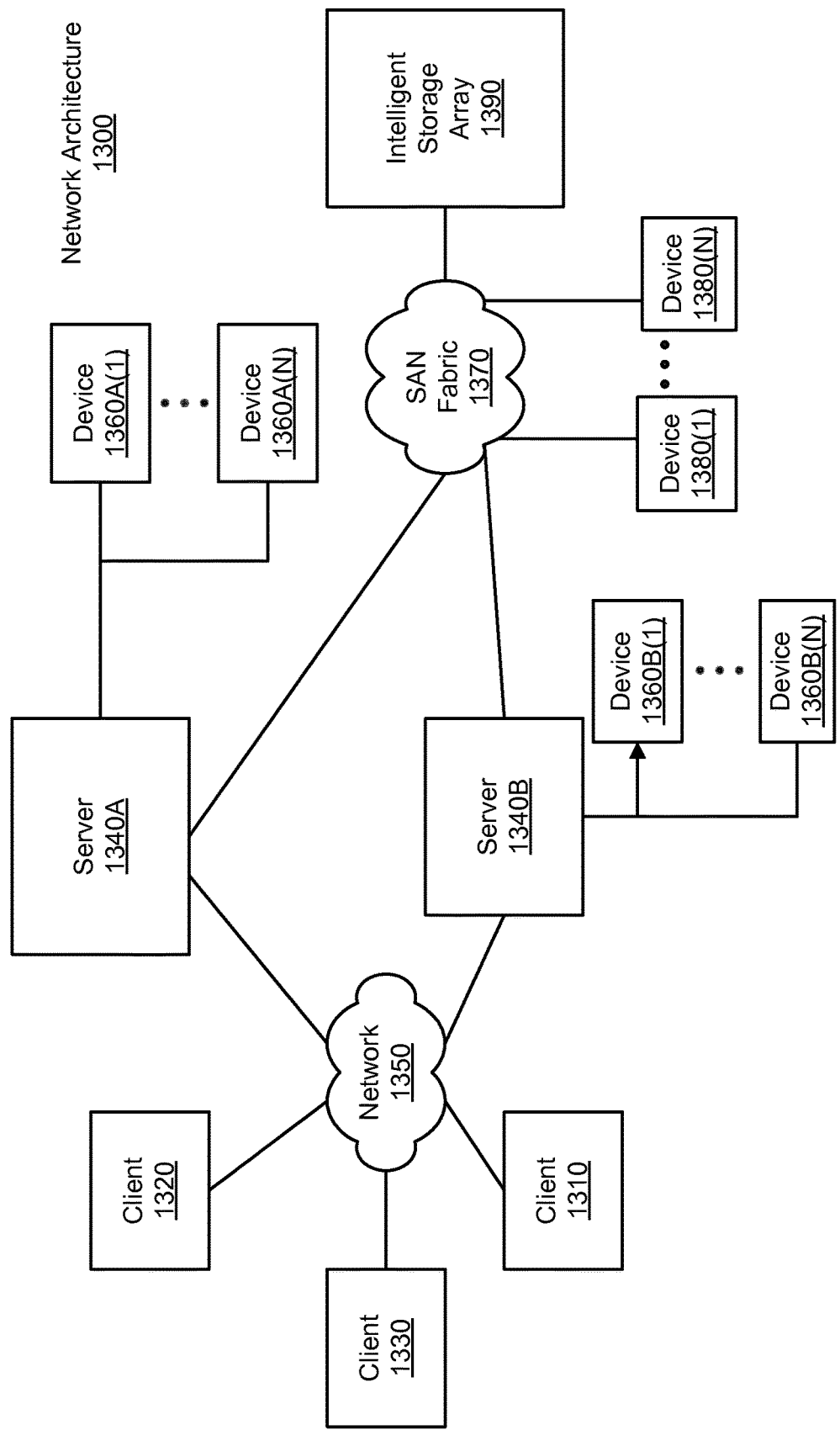
FIG. 13 is a block diagram depicting a network architecture suitable for implementing embodiments of the systems described herein.

FIG. 13 is a block diagram depicting a network architecture 1300 in which client systems 1310, 1320 and 1330, as well as storage servers 1340A and 1340B (any of which can be implemented using computer system 1310), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the systems described herein are not limited to the Internet or any particular network-based environment.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
    accessing a backup of a construct of an application, wherein
        the construct comprised
            a plurality of data blocks, and
            a data structure,
        the backup was produced by an original backup operation that used a first backup technique, and
        the first backup technique backed up the plurality of data blocks without regard to whether each of the plurality of data blocks was in-use or unused by the application at a time at which the original backup operation was performed;
    retrieving the data structure from the backup, wherein
        as a result of performance of the original backup operation, the backup comprises
            a data store comprising the plurality of data blocks, and
            the data structure, and
        the data structure comprises
            status information representing whether each data block of the plurality of data blocks was in-use or unused by the application at the time at which the original backup operation was performed; and
    performing a targeted backup operation on the backup, wherein
        the targeted backup operation is performed using a second backup technique, and
        the second backup technique differs from the first backup technique by virtue of the targeted backup operation comprising at least
            determining, using the data structure, whether a given data block of the plurality of data blocks was in-use or unused at the time at which the original backup operation was performed, and
            in response to a determination that the given data block was in-use at the time at which the original backup operation was performed,
                performing a backup operation on the given data block.

2. The method of claim 1, wherein, in further response to the determination that the given data block was in-use:
    determining whether the given data block is unique by performing a deduplication operation on the given data block, and
    performing the backup operation on the given data block, if the given data block is unique.

3. The method of claim 2, wherein
    the data store comprises the data structure,
    the plurality of data blocks comprise
        an in-use data block, and
        an unused data block, and
    the data structure is further configured to indicate that
        a state of the in-use data block is in-use, and
        a state of the unused data block is unused.

4. The method of claim 2, wherein
the data structure is a data store bitmap,
each bit of the data store bitmap indicates a state of the each data block of the plurality of data blocks, and
a state of the each data block of the plurality of data blocks is one of
in-use, or
unused.

5. The method of claim 2, wherein the retrieving comprises:
determining a location of header information in the backup,
determining a location of catalog information by accessing the header information,
determining a location of the data structure by accessing the catalog information, and
retrieving the data structure using the catalog information.

6. The method of claim 2, further comprising:
for the each data block of the plurality of data blocks,
retrieving the each data block of the plurality of data blocks,
determining whether the each data block of the plurality of data blocks should be backed up, wherein
the determining is based, at least in part, on a state of the each data block of the plurality of data blocks, and
in response to a determination that the each data block of the plurality of data blocks should be backed up, backing up the each data block of the plurality of data blocks.

7. The method of claim 2, further comprising:
for the each data block of the plurality of data blocks,
retrieving the each data block of the plurality of data blocks,
determining whether the each data block of the plurality of data blocks should be backed up, wherein
the determining is performed based on a state of the each data block of the plurality of data blocks, and
in response to a determination that the each data block of the plurality of data blocks should be backed up, determining if the each data block of the plurality of data blocks is a duplicate data block, and
in response to a determination that the each data block of the plurality of data blocks is not a duplicate data block, backing up the each data block of the plurality of data blocks.

8. The method of claim 2, further comprising:
retrieving the plurality of data blocks.

9. The method of claim 8, further comprising:
for the each data block of the plurality of data blocks,
determining whether the each data block of the plurality of data blocks should be backed up, wherein
the determining is based, at least in part, on a state of the each data block of the plurality of data blocks, and
in response to a determination that the each data block of the plurality of data blocks should be backed up, backing up the each data block of the plurality of data blocks.

10. The method of claim 8, further comprising:
for the each data block of the plurality of data blocks,
determining whether the each data block of the plurality of data blocks should be backed up, wherein
the determining is based, at least in part, on a state of the each data block of the plurality of data blocks, and
in response to a determination that the each data block of the plurality of data blocks should be backed up,
determining if the each data block of the plurality of data blocks is a duplicate data block, and
in response to a determination that the each data block of the plurality of data blocks is not a duplicate data block, backing up the each data block of the plurality of data blocks.

11. The method of claim 2, further comprising:
for the each data block of the plurality of data blocks,
determining whether the each data block of the plurality of data blocks should be backed up, and
in response to a determination that the each data block of the plurality of data blocks should be backed up, backing up the each data block of the plurality of data blocks.

12. The method of claim 2, further comprising:
for the each data block of the plurality of data blocks,
determining whether the each data block of the plurality of data blocks should be backed up, and
in response to a determination that the each data block of the plurality of data blocks should be backed up,
determining if the each data block of the plurality of data blocks is a duplicate data block, and
in response to a determination that the each data block of the plurality of data blocks is not a duplicate data block, backing up the each data block of the plurality of data blocks.

13. The method of claim 2, wherein the targeted backup operation further comprises:
excluding an unused data block from the backup operation.

14. The method of claim 2, further comprising:
retrieving the plurality of data blocks;
performing a deduplication operation on the each data block of the plurality of data blocks; and
for the each data block of the plurality of data blocks,
determining whether the each data block of the plurality of data blocks should be backed up, and
in response to a determination that the each data block of the plurality of data blocks should be backed up, backing up the each data block of the plurality of data blocks.

15. The method of claim 1, wherein
the application is a database management system,
the construct is a database, and
the first backup technique, in backing up the plurality of data blocks without regard to whether the each data block of the plurality of data blocks was in-use or unused by the application at the time at which the original backup operation was performed, ignored representation in the status information as to whether the each data block of the plurality of data blocks was in-use or unused by the application at the time at which the original backup operation was performed.

16. A computer program product comprising:
a plurality of instructions, comprising
a first set of instructions, executable on a computer system, configured to access a backup of a construct of an application, wherein
the construct comprised
a plurality of data blocks, and
a data structure,
the backup was produced by an original backup operation that used a first backup technique, and
the first backup technique backed up the plurality of data blocks without regard to whether each of the plurality of data blocks was in-use or unused by the application at a time at which the original backup operation was performed;
a second set of instructions, executable on the computer system, configured to retrieve the data structure from the backup, wherein
as a result of performance of the original backup operation, the backup comprises
a data store comprising the plurality of data blocks, and
the data structure, and
the data structure comprises
status information representing whether each data block of the plurality of data blocks was in-use or unused by the application at the time at which the original backup operation was performed; and
a third set of instructions, executable on the computer system, configured to perform a targeted backup operation on the backup, wherein
the targeted backup operation is performed using a second backup technique, and
the second backup technique differs from the first backup technique at least by virtue of the targeted backup operation being configured to
determine, using the data structure, whether a given data block of the plurality of data blocks was in-use or unused at the time at which the original backup operation was performed, and
in response to a determination that the given data block was in-use at the time at which the original backup operation was performed, perform a backup operation on the given data block; and
a non-transitory computer-readable storage medium, wherein the instructions are encoded in the non-transitory computer-readable storage medium.

17. The computer program product of claim 16, wherein, in further response to the determination that the given data block was in-use:
determining whether the given data block is unique by performing a deduplication operation on the given data block, and
performing the backup operation on the given data block, if the given data block is unique.

18. The computer program product of claim 17, wherein the instructions further comprise:
a third set of instructions, executable on the computer system, configured to, for the each data block of the plurality of data blocks,
determine whether the each data block of the plurality of data blocks should be backed up, and
in response to a determination that the each data block of the plurality of data blocks should be backed up, back up the each data block of the plurality of data blocks.

19. The computer program product of claim 17, wherein the instructions further comprise:
a third set of instructions, executable on the computer system, configured to, for the each data block of the plurality of data blocks,
determine whether the each data block of the plurality of data blocks should be backed up, and
in response to a determination that the each data block of the plurality of data blocks should be backed up, determine if the each data block of the plurality of data blocks is a duplicate data block, and
in response to a determination that the each data block of the plurality of data blocks is not a duplicate data block, back up the each data block of the plurality of data blocks.

20. The computer program product of claim 17, wherein the instructions further comprise:
a third set of instructions, executable on the computer system, configured to retrieve the plurality of data blocks;
a fourth set of instructions, executable on the computer system, configured to perform a deduplication operation on the each data block of the plurality of data blocks; and
a fifth set of instructions, executable on the computer system, configured to, for the each data block of the plurality of data blocks,
determine whether the each data block of the plurality of data blocks should be backed up, and
in response to a determination that the each data block of the plurality of data blocks should be backed up, back up the each data block of the plurality of data blocks.

21. A computer system comprising:
one or more processors;
a computer-readable storage medium, coupled to the one or more processors; and
a plurality of instructions, encoded in the computer-readable storage medium and configured to cause the one or more processors to
access a backup of a construct of an application, wherein
the construct comprised
a plurality of data blocks, and
a data structure,
the backup was produced by an original backup operation that used a first backup technique, and
the first backup technique backed up the plurality of data blocks without regard to whether each of the plurality of data blocks was in-use or unused by the application at a time at which the original backup operation was performed,
retrieve the data structure from the backup, wherein
as a result of performance of the original backup operation, the backup comprises
a data store comprising the plurality of data blocks, and
the data structure, and
the data structure comprises
status information representing whether each data block of the plurality of data blocks was in-use or unused by the application at the time at which the original backup operation was performed, and
perform a targeted backup operation on the backup, wherein
the targeted backup operation is performed using a second backup technique, and
the second backup technique differs from the first backup technique at least by virtue of the targeted backup operation being configured to
determine, using the data structure, whether a given data block of the plurality of data blocks was in-use or unused at the time at which the original backup operation was performed, and in response to a determination that the given data block was in-use at the time at which the original backup operation was performed, perform a backup operation on the given data block.

\* \* \* \* \*